(12) United States Patent
Barfield, III

(10) Patent No.: US 12,365,460 B1
(45) Date of Patent: Jul. 22, 2025

(54) AERIAL SPREADING DEVICE

(71) Applicant: Charles Hamilton Barfield, III, Sutter Creek, CA (US)

(72) Inventor: Charles Hamilton Barfield, III, Sutter Creek, CA (US)

( * ) Notice: Subject to any disclaimer, the term of this patent is extended or adjusted under 35 U.S.C. 154(b) by 0 days.

(21) Appl. No.: 18/933,551

(22) Filed: Oct. 31, 2024

(51) Int. Cl.
*B64D 1/16* (2006.01)

(52) U.S. Cl.
CPC ..................................... *B64D 1/16* (2013.01)

(58) Field of Classification Search
CPC ..... A01K 67/30; A01K 67/31; A01M 9/0069; A62C 3/0228; A62C 3/0235; A62C 3/0242; A62C 3/025; B64D 1/00; B64D 1/02; B64D 1/0408; B64D 1/12; B64D 1/16; B64D 1/18; B64D 1/20; B64D 37/20; B64D 37/22; B64D 37/24; B64D 37/26; B64D 37/28; B64U 2101/45; B64U 2101/47; F41F 3/06; F41F 3/065; F41F 5/00; F41F 5/04; F41F 7/00
USPC ......................................................... 244/136
See application file for complete search history.

(56) References Cited

U.S. PATENT DOCUMENTS

| | | | |
|---|---|---|---|
| 1,426,338 A * | 8/1922 | Sperry | B64D 1/16 40/213 |
| 1,584,945 A | 5/1926 | Elmer | |
| 2,539,816 A | 1/1951 | Denlinger | |
| 2,562,524 A * | 7/1951 | Burnum | B64D 1/16 251/324 |
| 2,582,678 A | 1/1952 | Mal | |
| 2,614,733 A | 10/1952 | Anderson | |
| 2,730,402 A * | 1/1956 | Whiting, Jr. | B64D 1/16 239/371 |
| 2,772,061 A * | 11/1956 | Sellers | B64D 1/16 239/171 |
| 2,979,273 A * | 4/1961 | Liebhart | B64D 1/16 239/550 |
| 3,140,013 A | 7/1964 | Schecter | |
| 3,351,305 A | 11/1967 | Warner | |
| 3,420,175 A * | 1/1969 | Miller | B64D 1/16 102/217 |
| 3,476,337 A | 11/1969 | Cornett, Jr. | |

(Continued)

FOREIGN PATENT DOCUMENTS

| | | | | |
|---|---|---|---|---|
| CN | 109305364 A | * | 2/2019 | ............... B64D 1/02 |
| KR | 1701975 B1 | * | 2/2017 | ............... B64D 1/02 |
| KR | 1778882 B1 | * | 9/2017 | ........... B64C 39/024 |

*Primary Examiner* — Joshua E Rodden
(74) *Attorney, Agent, or Firm* — Dunlap Bennett & Ludwig, PLLC; Jeff A. Burke

(57) ABSTRACT

A remotely actuated aerial spreading device is provided. The device includes a plurality of components including a nose cone hingably and actuatably coupled to a first opening of a container, a rear door hingably and actuatably coupled to a second opening of the container, a plurality of actuators, a mounting block coupled to the container, and a housing having a plurality of operational components disposed therein. In operation, a wireless actuation signal is received by one of the plurality of operational components which causes an actuator to release a lock allowing the rear door to open, allowing suction to build in the container. After a brief delay a second actuator causes the nose cone to actuate introducing airflow into the first opening. Airflow introduced to the container through the first opening causes a payload to be dispersed.

7 Claims, 4 Drawing Sheets

(56) References Cited

U.S. PATENT DOCUMENTS

| | | | |
|---|---|---|---|
| 3,777,978 A | 12/1973 | Manicatide et al. | |
| 4,417,709 A | 11/1983 | Fehrm | |
| 4,453,675 A * | 6/1984 | Kodadek | A01M 1/14 |
| | | | 239/171 |
| 4,877,203 A | 10/1989 | Harden | |
| 7,178,209 B1 | 2/2007 | Radziewicz | |
| 11,465,855 B2 | 10/2022 | Shinomiya et al. | |
| 2005/0017131 A1 | 1/2005 | Hale et al. | |
| 2008/0302884 A1* | 12/2008 | Petersen | B64D 1/18 |
| | | | 239/171 |
| 2011/0220733 A1 | 9/2011 | Larson et al. | |
| 2014/0202322 A1 | 7/2014 | Schnitzer | |

\* cited by examiner

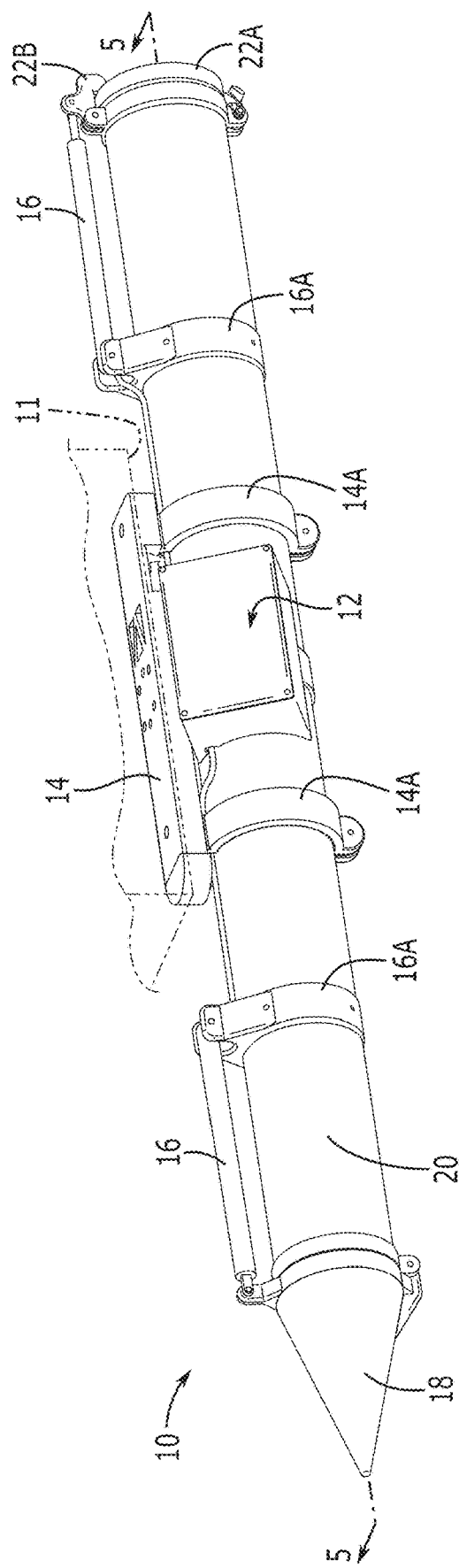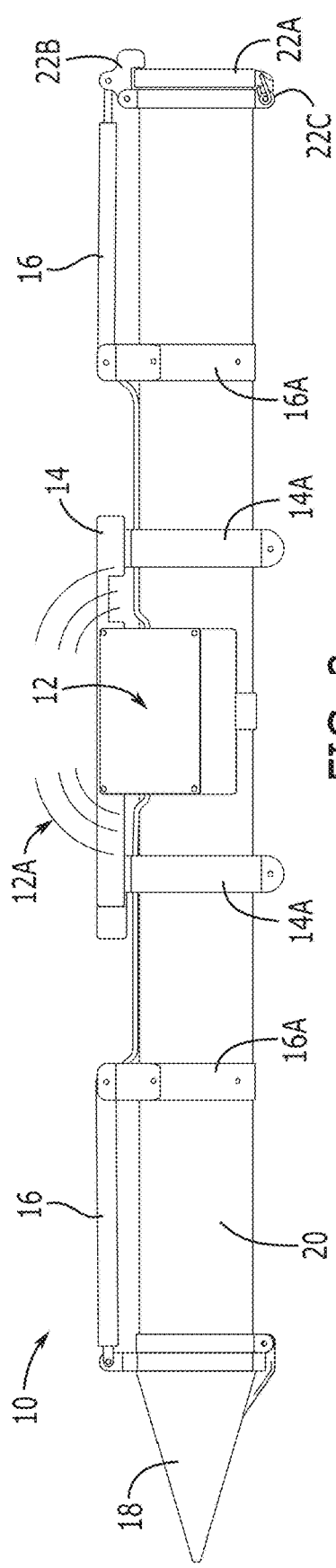

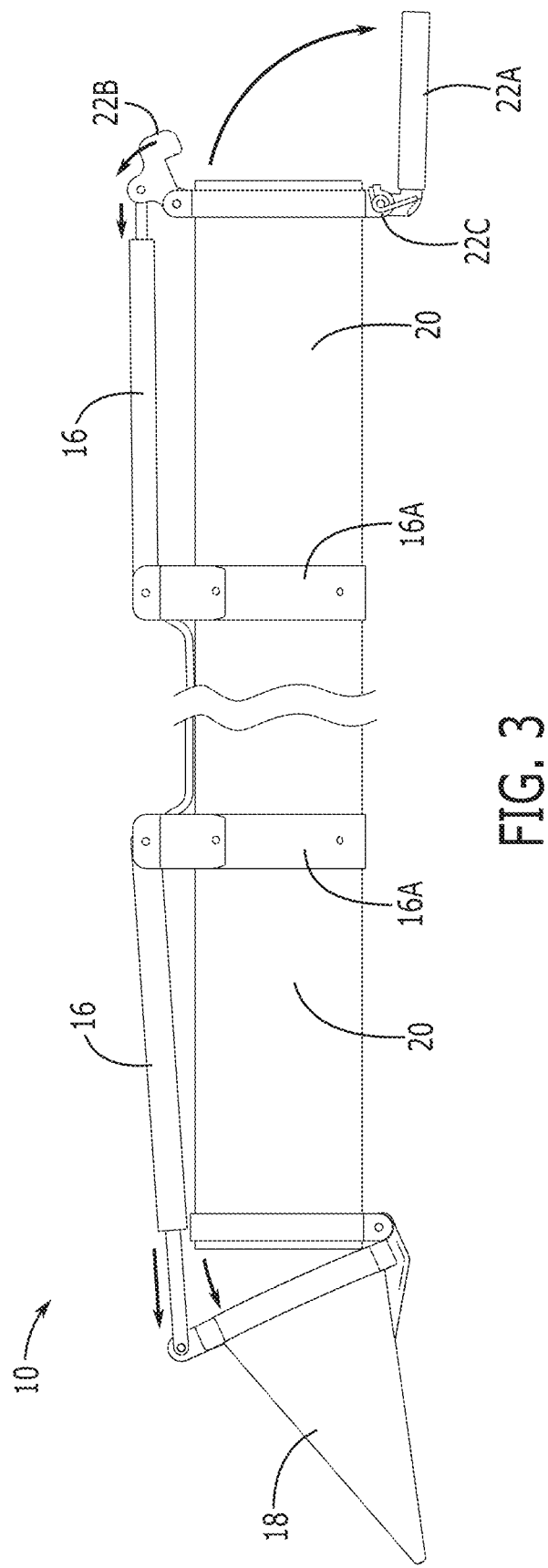

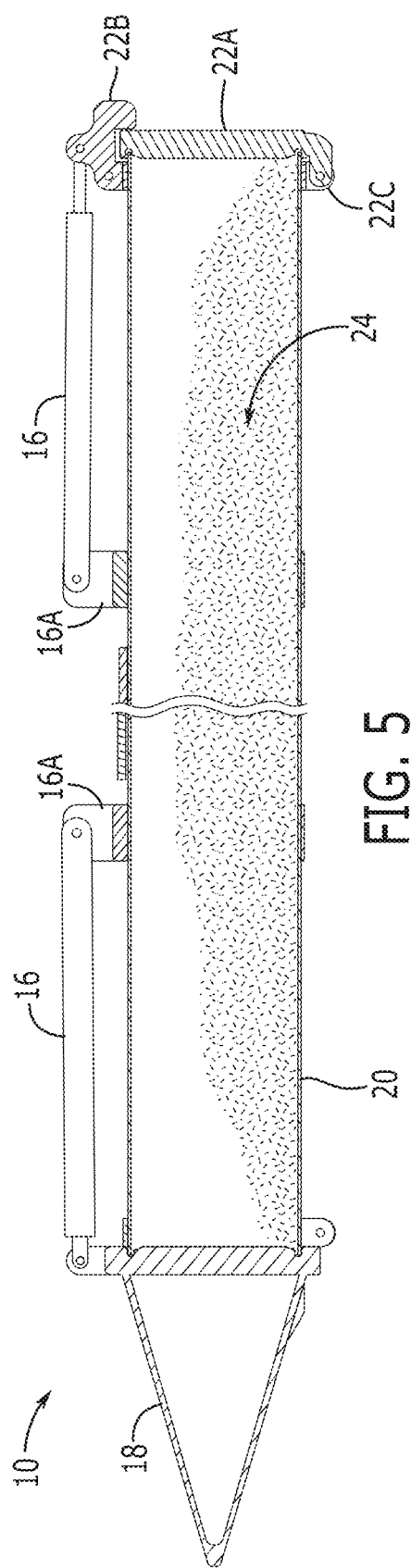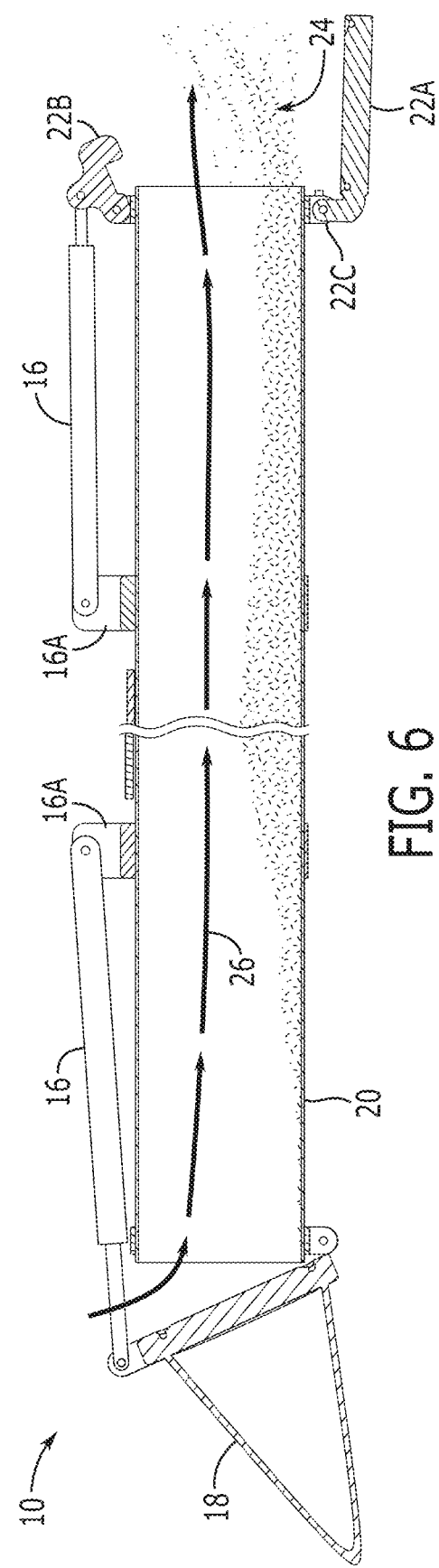

AERIAL SPREADING DEVICE

BACKGROUND OF THE INVENTION

The present invention relates to spreading devices, and, more particularly, to an aerial spreading device configured to automatically spread cremains in response to a trigger.

Spreading cremated ashes, or cremains, has become a popular way to pay tribute to deceased loved ones. Traditionally, the cremains are placed in a container and transported to a desired location, where the cremains are spread. More recently, aerial dispersal of cremains has become popular, as view many locations, unreachable by foot or car, are accessible, at least from the sky, via an airplane. However, traditional mechanisms for dispersing cremains are ineffective in airplanes, as simply dumping the contents out of a window result in the cremains coming back into the airplane.

Traditional aerial cremation spreading devices are used through a window or door. Operating these devices may cause a heavy workload on the pilot and may allow the pilot to become distracted from flying the airplane. Opening a door or window also causes the airplane to be influenced by outside elements and creates air speed limitations.

As can be seen, there is a need for an aerial spreading device configured to automatically spread cremains in response to a trigger thereby preventing increased pilot workload, and preventing cremains from intruding into the cockpit of the airplane.

SUMMARY OF THE INVENTION

In one aspect of the present invention, an aerial spreading device is provided. In the present invention the aerial spreading device can include a mount having a body, a plurality of apertures disposed on a first surface of the body and configured to secure the mount to a surface, and a plurality of brackets affixed to a second surface of the body. A tubular container having a first opening and a second opening configured to store a payload can be provided and can be affixed to the mount utilizing the plurality of brackets. A nose cone can be affixed to the first opening by a first hinge. A rear door can be affixed to the second opening by a second hinge. A lock can be affixed to the container proximate to the second opening. A first actuator can be operatively connected to the nose cone, and can be configured to actuate the nose cone. A second actuator can be operatively connected to the rear door, and can be configured to actuate the lock. A housing can be affixed to the tubular container proximate to the mount.

In another aspect of the present invention, a method of spreading a payload can be provided. In the present invention the method can include providing the aerial spreading device of the present invention. In response to a trigger, such as a signal from a remote control device, the lock can actuate to release the rear door which opens with assistance of a spring disposed in a hinge. After a brief delay, the nose cone of the device can be actuated utilizing the first actuator to expose the first opening to airflow. The payload can then be dispersed utilizing airflow through the tubular container. Advantageously, the rear door opens before the nose cone to prevent back pressure and to create suction to disperse the payload.

These and other features, aspects and advantages of the present invention will become better understood with reference to the following drawings, description, and claims.

BRIEF DESCRIPTION OF THE DRAWINGS

FIG. 1 is a front perspective view of an embodiment of an aerial spreading device, according to aspects of the present invention;

FIG. 2 is a side elevation view of an embodiment of an aerial spreading device, according to aspects of the present invention;

FIG. 3 is a detailed side elevation view of an embodiment of an aerial spreading device, according to aspects of the present invention;

FIG. 5 is a cross-section view of an embodiment of an aerial spreading device taken along line 5-5 of FIG. 1, according to aspects of the present invention; and FIG. 6 is a cross-sectional view of an embodiment of an aerial spreading device shown in-use, according to aspects of the present invention.

DETAILED DESCRIPTION OF THE INVENTION

Figure 4:
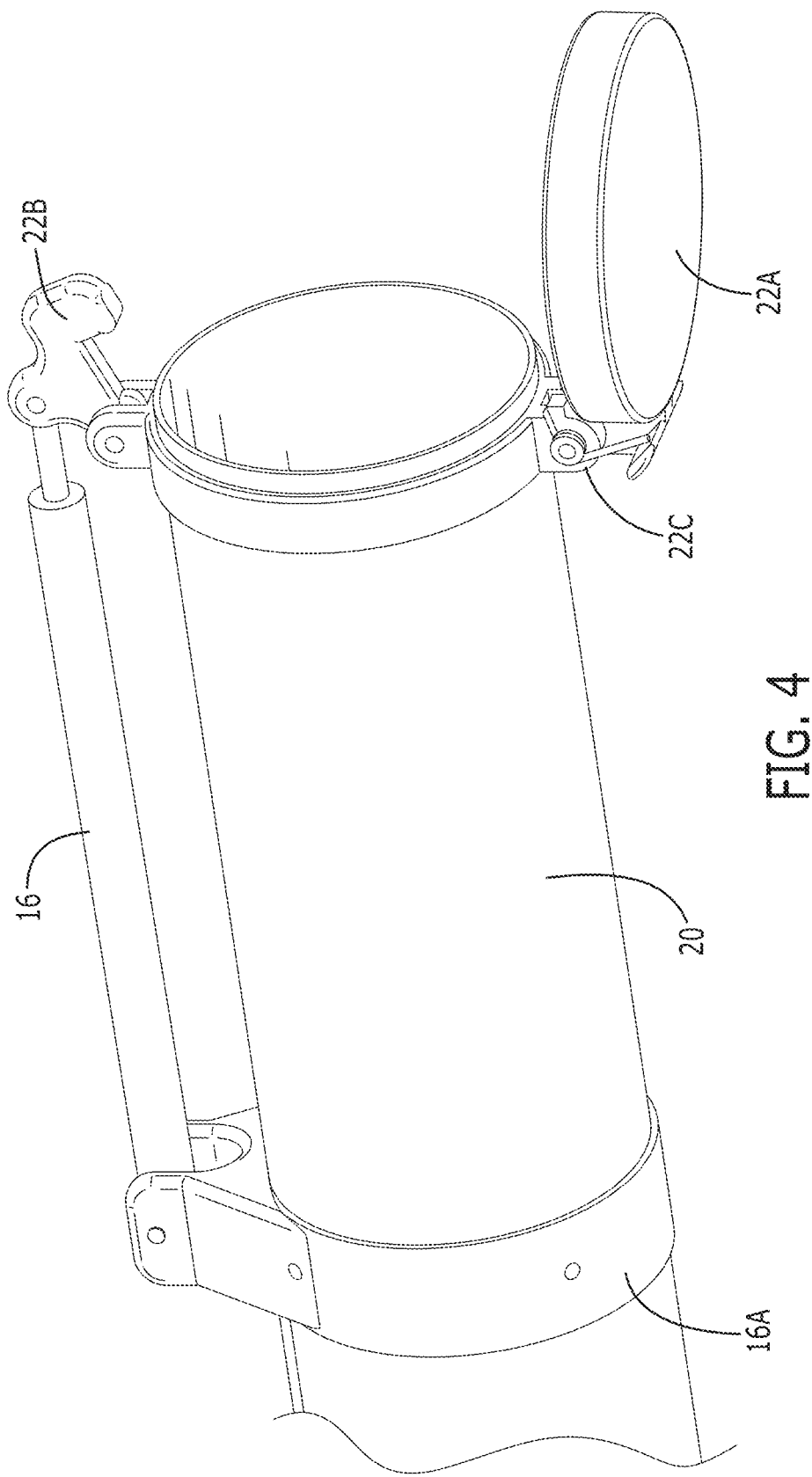
FIG. 4 is a detailed top perspective view of an embodiment of a rear of an aerial spreading device, according to aspects of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an aerial spreading device configured to spread material in response to a trigger. In the present invention, the aerial spreading device can include a plurality of components such as a container, a mount and/or mounting system, an actuatable nose cone, an actuatable rear door, a component housing, at least one power source, and one or more hardware, circuitry, and/or software configured to operate the aerial spreading device. In the present invention, a portion of the plurality of components, such as the container, a mount and/or mounting system, an actuatable nose cone, an actuatable rear door, and the component housing, can be made from durable materials such as carbon fiber, aircraft grade aluminum, or other aircraft grade materials.

Referring to FIGS. 1-6, aspects of an aerial spreading device 10 are illustrated. Aerial spreading device 10 can be composed of a plurality of components and can be configured to dispose cremains, or other payloads, stored therein. In embodiments, aerial spreading device 10 can be mounted to a portion of an aircraft 11 (as illustrated in FIG. 1) by a mounting block 14. In embodiments, mounting block 14 can include a body portion with a plurality of apertures, or ports, through a first surface and configured for quick attachment/release to a portion of aircraft 11. Mounting block 14 can also include a plurality of brackets 14A, clamps, or cuffs, such as dovetail joints, configured to secure container 20. In embodiments, mounting block 14 is certified, via supplemental type certification, for use in aircraft applications.

A housing 12 can house a plurality of components, such as a electronic circuitry configured to operate components of device 10, and a power source, such as a battery, or batteries, configured to provide power to components of device 10. In embodiments, the electronic circuitry can include a microprocessor, microcontroller, or other computing device, having hardware and/or software installed thereon, and configured to control actuation of device 10. Additionally, the electronic circuitry can include at least one wireless communication device, utilizing known protocols, such as Bluetooth, NFC, WIFI, radio receiver/transceiver, and configured to receive/transmit wireless signals for actuating device 10 (as illustrated in FIG. 2). Housing 12 can be affixed to container 20, proximate to mounting block 14, by one or more fasteners, such as a clamp, clasp, cuff, or other known fasteners in the art.

Container 20 can be tubular in shape, but is not so limited, and can have an opening at a first end, an opening at a second end and an inner portion configured to house a payload 24, such as cremains, powders, liquids, etc (as illustrated in FIG. 5). A nose cone 18 can be provided and secured to the opening at the first end of container 20. In embodiments, nose cone 18 is conical in shape for aerodynamic considerations, but can be shaped in other aerodynamic shapes. Nose cone 18 can be hingably affixed to container 20 at the opening at the first end, and can also be actuatably affixed to an actuator 16 (as illustrated in FIG. 3) which can be secured to container 20 by an actuator holder 16A. A rear door 22a can be hingably affixed to container 20 at the opening at the second end, via hinge 22c. In embodiments, hinge 22c can include a spring thereon, such that a force generated by the spring can force rear door 22a open. Additionally, an actuatable lock 22b can secure rear door 22a in a closed configuration (as illustrated in FIGS. 1-2). Actuatable lock 22b can be actuatably affixed to an actuator 16 (as illustrated in FIGS. 1-4) which can be secured to container 20 by an actuator holder 16A. In embodiments, actuators 16 can be pen style linear actuators, but are not so limited, as an electrically actuatable linear actuator is envisioned to be within the scope of the invention.

In operation a trigger (not shown), such as a button, switch, key fob, or other actuatable interface can provide a wireless signal 12A, such as a radio signal, Bluetooth signal, or other known wireless protocol signal, which can be received by electronic circuitry in housing 12 (as illustrated in FIG. 2). In embodiments, the trigger can be a key fob, similar to those utilized in automobile applications, for locking/unlocking doors, which can transmit an actuation signal, as a radio signal in the range of 20 GHz to 300 GHz. The trigger can cause electronic circuitry to send a signal to an actuator 16, connected to actuatable lock 2B, which can cause actuatable lock 22B to open (as illustrated in FIG. 3). In embodiments, once actuatable lock 22B releases rear door 22a spring disposed in hinge 22c causes rear door to spring open. Advantageously, rear door 22c opens first to prevent back flow and allow suction to build for dispersal of payload 24. After a brief delay, actuator 16, connected to nose cone 18, can cause nose cone 18 to open (as illustrated in FIG. 3). Upon dispersal of payload 24, trigger can provide a second wireless signal causing nose cone 18 to close via actuator 16.

Utilizing of force provided by airflow is further illustrated in FIG. 6. Cross-sectionally FIG. 5 illustrates device 10 in a closed configuration, housing a payload 24. Upon actuation of rear door 22*a* via actuation of lock 22*b* and springing of hinge 22*c*, suction builds to disperse payload 24. After a short delay, airflow 26 is introduced into an interior of container 20 by actuation of nose cone 18 via actuator 16. Payload 24 is then dispersed utilizing airflow 26, and upon complete dispersal actuator 16 connected to nose cone 18 is actuated to close nose cone 18, in response to a second received signal. In embodiments, due to spring in hinge 22*c*, rear door 22*a* remains open until manual reset, which can be accomplished after landing. Advantageously, wireless actuation of device 10 allows an operator to disperse a payload 24 safely and efficiently.

It should be understood, of course, that the foregoing relates to exemplary embodiments of the invention and that modifications may be made without departing from the spirit and scope of the invention as set forth in the following claims.

What is claimed is:

1. An aerial spreading device, comprising:
- a mount, comprising:
  - a body;
  - a plurality of apertures disposed on a first surface of the body and configured to secure the mount to a surface; and
  - a plurality of brackets affixed to a second surface of the body;
- a tubular container having a first opening and a second opening, the tubular container affixed to the mount utilizing the plurality of brackets;
- a nose cone affixed to the first opening by a first hinge;
- a rear door affixed to the second opening by a second hinge;
- a lock affixed to the container proximate to the second opening;
- a first actuator operatively connected to the nose cone, and configured to actuate the nose cone;
- a second actuator operatively connected to the rear door, and configured to actuate the lock; and
- a housing affixed to the tubular container, proximate to the mount.

2. The aerial device of claim 1, wherein the second hinge further comprises:
- a spring configured to return the second hinge to a default position.

3. The aerial device of claim 1, further comprising:
- at least one computing device configured to control the first actuator and the second actuator;
- at least one communication device configured to receive a signal for triggering actuation of the first actuator and the second actuator; and
- at least one power source configured to provide power to the first actuator, the second actuator, the at least one communication device, and the at least one computing device.

4. The device of claim 1, further comprising:
- a remote control communicatively coupled to the device.

5. The device of claim 1, wherein the device is made of carbon fiber.

6. A method of spreading a payload, the method comprising:
- providing an aerial spreading device, comprising:
  - a mount, having a body, a plurality of apertures disposed on a first surface of the body and configured to secure the mount to a surface, and a plurality of brackets affixed to a second surface of the body;
  - a tubular container having a first opening and a second opening, the tubular container affixed to the mount utilizing the plurality of brackets;
  - a nose cone affixed to the first opening by a first hinge;
  - a rear door affixed to the second opening by a second hinge;
  - a lock affixed to the container proximate to the second opening;
- a first actuator operatively connected to the nose cone, and configured to actuate the nose cone;
- a second actuator operatively connected to the rear door, and configured to actuate the lock; and
- a housing affixed to the tubular container, proximate to the mount;

placing a payload into the tubular container;
in response to a trigger, actuating the lock via the second actuator; and
actuating the nose cone via the first actuator to expose the first opening.

7. The method of claim 6, wherein the nose cone is actuated via the first actuator after a delay.

* * * * *